3,100,694
TREATMENT OF SOLIDS WITH LIQUIDS
Franz Schaub, Oberhausen-Holten, Helmut Kolling, Duisburg-Hamborn, Theodor Notthoff and Ewald Stiebling, Oberhausen-Sterkrade, and Heinz Rudolf Ruggeberg, Oberhausen-Holten, Germany, assignors to Ruhrchemie Aktiengesellschaft, Oberhausen-Holten, Germany
Filed July 13, 1956, Ser. No. 597,656
Claims priority, application Germany July 28, 1955
3 Claims. (Cl. 23—270)

In process engineering, the problem often arises to subject more or less finely divided solids, especially powdered solids, to a treatment with liquids, e.g. for the purpose of washing out undesirable constituents or auxiliary materials used in the manufacture of displacing obstinately retained liquids, extracting useful components, effecting chemical conversions, and in dissolving processes. Up to the present, processes of this kind have been frequently carried out intermittently, or a considerable amount of equipment was required for continuous operation. This involved the disadvantage of a high consumption of liquid or a poor utilization of the liquid.

These disadvantages can be overcome, and the treatment of divided and especially powdered solids having a lower specific gravity than that of the liquids used for their treatment, or normally floating on the liquids, can be performed in a very efficient manner and in continuous operation, if the solids are carried, by means of any type of conveying device, through a horizontally or nearly horizontally arranged treating chamber which is filled with the treating liquid to a more or less high level, but never filled completely. There, the solids are mixed with the liquid, and, in being mixed, undergo a treatment by the same. The liquid will have a flow direction which is independent of the direction of motion of the solids, by suitably providing inlets and outlets for the liquid and by establishing an appropriate liquid head.

The process according to the invention will now be described with reference to the accompanying drawing, in which two embodiments of an apparatus for carrying out the process are illustrated by way of example; it should however be understood that changes in this apparatus could be made without departing from the spirit of the invention.

Figure 1:
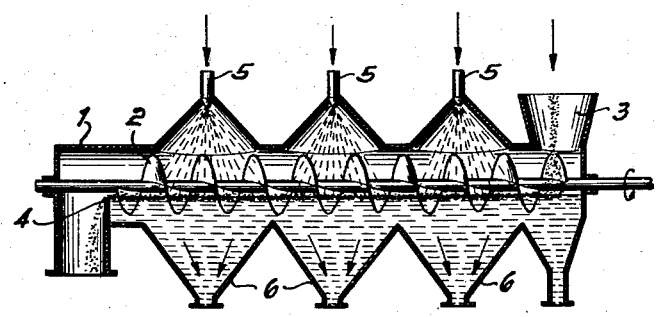
Figure 2:
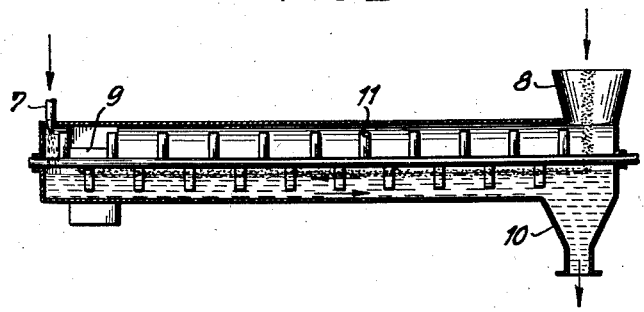
Figure 2A:
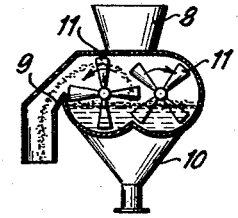

FIGS. 1 and 2 of the drawing are longitudinal sections through a device illustrated diagrammatically.

Referring now to FIG. 1, a horizontal container 1 is shown to be equipped with a screw conveyor 2. The solid material to be treated is fed at one end of the screw conveyor through a hopper 3, and, while floating in the liquid, moved to the discharge end where it is discharged from the liquid over a weir 4. The treating liquid is fed from above and in distributed form to the surface of the contents of the container at several points 5 distributed over the length or part of the length of the treating chamber. It may be advantageous under certain circumstances to distribute the liquid over the surface by means of spray nozzles arranged at said points 5. The spent treating liquid, after having washed round the floating solid particles, is withdrawn at the bottom of the conveyor trough at one or several discharge openings 6 distributed over the whole length. This results in a cross current being set up between the solid material and the liquid.

Instead of a screw conveyor, use may be made of any other type of conveying device which moves the product from one end of the container to the other with the product being preferably at the surface of the liquid. Use may also be made of, for example, trough conveyors which are permeable to water.

For certain processes, it has been found particularly advantageous to cause an efficient turbulent motion of solids and liquid to take place during the transportation of the solids through the liquid. In many cases, this results in a substantial shortening of the treating time and a better action of the treating liquid. This is accomplished, according to the invention, by generally using paddle screws, which may be single screws or preferably twin screws. These may rotate in the same or in opposite sense. By adjusting the angular position of the paddles, the ratio of forces spent in feeding and in generating turbulence may be varied within wide limits and adapted to any particular process.

A further improvement is obtained by passing the liquid in countercurrent flow to the solids. According to the invention, as shown in FIG. 2, this is achieved by admitting the fresh water or the fresh treating liquid at one end 7 of a treatment vessel where the solids are discharged, and withdrawing the treating liquid, charged with the dissolved matter, at the inlet side 8 of the solids. A shaft with paddles or blades 12 forms the conveyor in this embodiment.

For carrying out the process, a weir 9 is arranged at the end where the solids are discharged. Over this weir, most or all of the solid material, still moist, is discharged, or thrust out or ladled out, e.g. by blades 11, while the liquid level is kept sufficiently low, so that the fresh water is normally not capable of flowing off over the weir. By providing an appropriate drop contrary to the feeding direction of the conveying device (and consequently to the direction of motion of the solids), water flows to the inlet end of the solids, undergoing intimate exchange with the latter, and continuously runs off in the spent state.

By this countercurrent flow, which is preferably provided in connection with a violent turbulent motion of the solids and the liquid, there results a surprisingly good washing effect with a minimum amount of liquid and a short residence time for the solids. It is thus possible to perform a washing process with substantially lower installation expenses and cost of treating liquid, as compared to the treatment by conventional methods. Depending on the particular requirements, it is furthermore possible to vary both the residence time of the solids and the degree of intermixing of solids and liquid by adjustment of the blade velocity and of the angle of inclination of the blades on the conveyor.

Moreover, according to the invention, a calming zone 10 may be provided at the inlet end of the solid material. In this zone, the solids float on the liquid, and entrained parts and impurities of higher specific gravity are given the opportunity to settle at the bottom of the container, from where they may be withdrawn from time to time. In this manner, an efficient purification of the product can be simultaneously obtained.

As stated above, the discharge of the solids is preferably effected by means of one or two blades 11 by which the product, after having passed the treating zone, is thrust out to the side of the container. As distinguished from the other paddles, the discharge blades may be constructed so that an extensive separation of still adhering liquid drops is achieved at the same time and a product which is poor in liquid is discharged. For this purpose, the discharge blades may, for example, be perforated or the blade surface may be attached to the shaft by means of thin bars.

The discharge may, of course, also be effected in any other manner, for example by means of a screw conveyor carrying the material in upward direction out of the trough, or by means of any other scooping device.

Some examples of the possibilities of applying the present invention industrially are the washing or other treatment of plastic powder or granules with liquids, especially of polyethylene, and the extraction of oil seeds.

What we claim is:

1. A device for the single-step treatment with liquids of comminuted and powdered solids of substantially uniform specific gravity which is lower than that of said liquids, which comprises, in combination, a substantially horizontal treating chamber, an inlet for said liquids on the top of one end of said chamber, an outlet in the form of a syphon for the removal of liquid at the opposing end of said chamber, said syphon being disposed in a manner as to produce a drop in the level from said inlet toward said outlet, an inlet for said solids on the top of the end where said outlet for said liquids is situated, agitator paddles disposed in said chamber and adapted for adjustable inclination with respect to the longitudinal axis of said chamber and moving said solids countercurrently to said liquids, an outlet for said solids at the end of said chamber where said inlet for said liquids is located, and discharge blades disposed in said outlet to remove said solids after treatment.

2. The device according to claim 1, wherein part of said paddles are disposed parallel to said axis.

3. The device according to claim 1, wherein said discharge blades are perforated.

References Cited in the file of this patent

UNITED STATES PATENTS

| | | |
|---|---|---|
| 2,530,676 | Berg et al. | Nov. 21, 1950 |
| 2,547,577 | Hamacher et al. | Apr. 3, 1951 |
| 2,630,302 | Jones | Mar. 3, 1953 |

FOREIGN PATENTS

| | | |
|---|---|---|
| 1,550 | Great Britain | Aug. 5, 1909 |
| 549,683 | Great Britain | Dec. 2, 1942 |